US010674343B2

(12) United States Patent
Suzuki et al.

(10) Patent No.: US 10,674,343 B2
(45) Date of Patent: *Jun. 2, 2020

(54) COMMUNICATION APPARATUS, TERMINAL, AND COMMUNICATION METHOD

(71) Applicant: NEC Corporation, Tokyo (JP)

(72) Inventors: Naoaki Suzuki, Tokyo (JP); Toshiyuki Tamura, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 16/400,714

(22) Filed: May 1, 2019

(65) Prior Publication Data
US 2019/0327598 A1 Oct. 24, 2019

Related U.S. Application Data

(63) Continuation of application No. 15/739,251, filed as application No. PCT/JP2016/069025 on Jun. 27, 2016, now Pat. No. 10,327,126.

(30) Foreign Application Priority Data

Jun. 26, 2015 (JP) ................................. 2015-128856

(51) Int. Cl.
H04W 4/90 (2018.01)
H04W 76/10 (2018.01)
(Continued)

(52) U.S. Cl.
CPC ............. *H04W 4/90* (2018.02); *H04L 65/104* (2013.01); *H04L 65/1016* (2013.01);
(Continued)

(58) Field of Classification Search
CPC .......... H04L 65/1006; H04L 65/1016; H04W 4/029; H04W 4/90; H04W 76/10;
(Continued)

(56) References Cited

U.S. PATENT DOCUMENTS

2005/0043008 A1* 2/2005 Hurita ................... H04W 76/50
455/404.1
2007/0060097 A1* 3/2007 Edge ................. H04L 29/06027
455/404.1
(Continued)

FOREIGN PATENT DOCUMENTS

WO WO-2009/100638 A1 8/2009

OTHER PUBLICATIONS

3GPP TS 23.167 V12.1.0 (Mar. 2015); 3rd Generation Partnership Project; Technical Specification Group Services and System Aspects; IP Multimedia Subsystem (IMS) emergency sessions (Release 12); 42 pages.
(Continued)

Primary Examiner — Nathan S Taylor
(74) Attorney, Agent, or Firm — Wilmer Cutler Pickering Hale and Dorr LLP

(57) ABSTRACT

A communication apparatus includes a location information acquisition unit that acquires location information of a terminal, a reception unit that receives a call request transmitted by the terminal, a service identification unit that identifies a service of the request based on the location information of the terminal and a destination telephone number of the request, and a transmission unit that transmits a response to the terminal, when the service corresponding to the request cannot be provided.

12 Claims, 7 Drawing Sheets

(51) Int. Cl.
*H04W 80/10* (2009.01)
*H04W 88/14* (2009.01)
*H04L 29/06* (2006.01)
*H04W 76/50* (2018.01)
*H04W 76/18* (2018.01)
*H04W 4/029* (2018.01)

(52) U.S. Cl.
CPC ...... *H04L 65/1033* (2013.01); *H04L 65/1069* (2013.01); *H04L 65/1073* (2013.01); *H04W 4/029* (2018.02); *H04W 76/10* (2018.02); *H04W 76/18* (2018.02); *H04W 76/50* (2018.02); *H04W 80/10* (2013.01); *H04W 88/14* (2013.01); *H04L 65/1006* (2013.01)

(58) Field of Classification Search
CPC ..... H04W 76/18; H04W 80/10; H04W 88/14; H04W 76/50; H04W 4/02; H04W 36/18; H04W 4/22; H04W 68/02; H04W 76/00; H04W 76/30; H04W 8/02; H04W 8/18
See application file for complete search history.

(56) References Cited

U.S. PATENT DOCUMENTS

| | | | |
|---|---|---|---|
| 2009/0191841 A1 | 7/2009 | Edge et al. | |
| 2009/0280770 A1* | 11/2009 | Mahendran | H04L 29/12594 455/404.1 |
| 2009/0296688 A1* | 12/2009 | Bakker | H04M 1/72536 370/352 |
| 2009/0296689 A1* | 12/2009 | Bakker | H04W 4/90 370/352 |
| 2009/0298458 A1* | 12/2009 | Bakker | H04M 3/42348 455/404.1 |
| 2010/0115110 A1* | 5/2010 | Hao | H04W 4/90 709/228 |
| 2010/0124897 A1* | 5/2010 | Edge | H04W 4/90 455/404.1 |
| 2011/0171924 A1* | 7/2011 | Faccin | H04W 4/90 455/404.1 |
| 2011/0188411 A1* | 8/2011 | Faccin | H04W 76/10 370/259 |
| 2011/0188416 A1* | 8/2011 | Faccin | H04W 76/10 370/310 |
| 2011/0189971 A1* | 8/2011 | Faccin | H04W 76/10 455/404.1 |
| 2012/0083240 A1* | 4/2012 | Patel | H04W 4/90 455/404.2 |
| 2014/0185490 A1* | 7/2014 | Holm | H04L 41/0893 370/259 |
| 2014/0301248 A1* | 10/2014 | Lindholm | H04L 69/24 370/259 |
| 2015/0281936 A1* | 10/2015 | Suh | H04W 60/04 455/404.1 |
| 2015/0358795 A1* | 12/2015 | You | H04W 4/90 455/404.2 |
| 2016/0100435 A1* | 4/2016 | Bakker | H04M 3/42348 455/404.1 |
| 2016/0278132 A1* | 9/2016 | Baek | H04W 4/90 |
| 2016/0295386 A1* | 10/2016 | Faccin | H04L 63/0485 |
| 2017/0005914 A1* | 1/2017 | Edge | H04W 4/90 |
| 2017/0215056 A1* | 7/2017 | Edge | H04W 4/90 |
| 2017/0366955 A1* | 12/2017 | Edge | H04W 4/90 |

OTHER PUBLICATIONS

3GPP TS 24.229 V13.1.0 (Mar. 2015); 3rd Generation Partnership Project; Technical Specification Group Core Network and Terminals; IP multimedia call control protocol based on Session Initiation Protocol (SIP) and Session Description Protocol (SDP); Stage 3; (Release 13); (873 pages).
3GPP TSG SA WG2 Meeting #109, S2-152061; Study on S8 Home Routing Architecture for VoLTE, Rel-14, May 25-29, 2015, (5 pages).
3GPP TSG-SA WG2#108 S2-150985, Discussion on S8HR VoLTE Roaming, Apr. 13-17, 2015, 15 pages.
3GPP Draft TSG, Research in Motion, "Correction to Emergency Service Request," C1-082335-24.229-841-PSAPS, XP050029609, Mobile Competence Centre, France, vol. CT WG1, No. Zagreb, Coatia, Jun. 15, 2008 (20 pages).
3GPP2 Draft, "All-IP Network Emergency Call Support," X.P0049-0, Version 1.0, vol. TSGX, Nov. 7, 2007, pp. 1-62, (68 pages).
Per-PLMN configuration in P-CSCF for Non UE Detectable Emergency Call Handling, 3GPP TSG-SA WG2#108 S2-150993, Apr. 7, 2015, 3 pages.
International Search Report corresponding to PCT/JP2016/069025, 1 page, dated Aug. 30, 2016.
Extended European Search Report dated Mar. 28, 2019 received in related European Patent Application No. 16814536.5 (11 pages).
Japanese Notice of Reasons for Refusal issued in Japanese Patent Application No. 2017-525478, dated Aug. 20, 2019, 6 pages.
NEC, NTT Docomo "Solution to Key Issue 2, Key Issue 3 and Key Issue 4", SA WG2 Temporary Document, SA WG2 Meeting #111, S2-153215 (revision of S2-15xxxx), Chengdu, P. R. China, Oct. 19-23, 2015, p. 1-6 (6 pages).

\* cited by examiner

COMMUNICATION APPARATUS, TERMINAL, AND COMMUNICATION METHOD

CROSS-REFERENCE TO RELATED APPLICATION

This application is a continuation of application Ser. No. 15/739,251 entitled "COMMUNICATION APPARATUS, TERMINAL, AND COMMUNICATION METHOD", filed Dec. 22, 2017, which claims the benefit of the priority of national stage application of International Application No. PCT/JP2016/069025 entitled "COMMUNICATION APPARATUS, TERMINAL, AND COMMUNICATION METHOD," filed on Jun. 27, 2016, which claims the benefit of the priority of Japanese Patent Application No. 2015-128856 filed on Jun. 26, 2015, the disclosures of each of which are hereby incorporated by reference in their entirety.

The present invention relates to a communication apparatus, a terminal, and a communication method.

TECHNICAL FIELD

Background

In LTE (Long Term Evolution) specified in 3rd Generation Partnership Project (3GPP), VoLTE (Voice over LTE) is used to connect a calling subscriber to a voice call partner through an IP multimedia subsystem (IP (Internet Protocol) Multimedia Subsystem: IMS). VoLTE provides voice communication as data communication (packet communication) in the LTE scheme. The VoLTE system includes, as its system configuration, a VoLTE-compatible terminal (User Equipment (UE)), LTE/EPC (Evolved Packet Core), and IMS. A method for connecting an emergency call via IMS to a PSAP (Public Safety Answering Point: Emergency Notification Acceptance Center) such as Police, Fire Department and Emergency etc. is specified in 4.1 Architectural Principles of Non-Patent Literature 1 and the like. IMS emergency call means an emergency call provided by IMS (for example, 110 in Japan). Emergency calls fall into a category of local service as a definition of telecom. In other words, dial numbers such as 110 and 119 are effective only in a relevant area (=in Japan). Emergency numbers in Europe (police, emergency, firefighting) are 122 (police in the UK is 110), which are effective only in Europe.

When a terminal (UE) transmits an IMS emergency call, the terminal (UE) sets up a connection (Emergency PDN connection) to a PDN (Packet Data Network) designated for emergency call. If the terminal is not registered in the IMS, the terminal carries out IMS Emergency Registration processing and then transmits a SIP (Session Initiation Protocol) INVITE request indicating an emergency call to a P-CSCF (Proxy Call Session Control Function) within the IMS. After the IMS receives the INVITE request, the IMS selects a connection destination of the emergency call, based on location information of the terminal. For example, after the P-CSCF receives the INVITE request from the terminal, the P-CSCF forwards the INVITE request to an E-CSCF (Emergency Call Session Control Function), which is a SIP server controlling the emergency call. The E-CSCF acquires, for example, cell identification information of a serving cell of the terminal as location information of the terminal via a LRF (Location Retrieval Function). The E-CSCF selects a route to a PSAP (Public Safety Answering Point) to be connected and then transmits the INVITE request. The LRF has a function of searching for location information of a terminal which has initiated an IMS emergency session and route information to the PSAP. It is noted that an emergency service URN (Emergency Service URN (uniform resource name)) (for example, urn: service: sos.police) is included in a "Request-URI (Uniform Resource Identifier)" of the INVITE request. Based on the emergency service URN, the E-CSCF sends a connection request for the emergency call to a police officer PSAP.

[Non-Patent Literature 1]
3GPP TS 23.167 V12.1.0 (2015-03) 4.1, 6.1, 7.1.2, 7.3
[Non-Patent Literature 2]
3GPP TS 24.229 V13.1.0 (2015-03) 5.1, 5.2, 7.2A.4
[Non-Patent Literature 3]
3GPP TSG SA WG2 Meeting #109, S2-152061 (2015-05)

SUMMARY

S8HR (S8 Home Routed) disclosed in Non-Patent Literature 3 or the like is a roaming scheme of VoLTE. In S8HR, an S8 interface between SGW (Serving gateway) and PGW (Packet Data Network gateway) of the Evolved Packet Core (EPC) core network is used in a form straddling operator networks. For example, let's assume that an IMS (IP Multimedia Subsystem) serving a call is on a home network (HPLMN (Home PLMN (Public Land Mobile Network)) side and a terminal (UE) roams to a VPLMN (Visited PLMN), and that PGW, PCRF (Policy and Charging Rules Function) and P-CSCF (Proxy Call Session Control Function) are all located in the home network (HPLMN). In S8HR, the S8 interface is used to provide all IP traffics including an IMS traffic Internet Protocol) traffic from the home network (HPLMN) to the roaming destination terminal (UE). The PGW is provided in the home network (HPLMN) of the terminal (UE), and an IP address to be assigned to the terminal (UE) is dispensed through the PGW by an operator on the home network side.

IMS emergency call with S8HR is an IMS emergency call transmitted by a user of the terminal (UE) at a movement destination (roaming destination). For example, if a traveler from the Netherlands stays in Japan and dials 110 in Japan which is an emergency number specific to Japan, from a terminal (home network is the Netherlands), the home network is the Netherlands, the roaming destination is Japan. If the traveler which is visiting to Japan from the Netherlands dials 110 from the terminal in Japan, all IMS traffics are transmitted to the Netherlands. As described above, the IMS emergency call is mainly processed in cooperation with IMS P-CSCF and E-CSCF. In this case, P-CSCF in the Netherlands which is the home network receives the number 110.

Regarding an implementation policy of the emergency call in a case where the P-CSCF is in the home network, reference may be made to Non-Patent Literature 1. For P-CSCF transmitting a SIP response code 380 and a terminal (UE) that receives the response code, reference may be made to Non-Patent Literature 2.

Providing, for an IMS emergency call with S8HR, an emergency call service to a roaming destination by an IMS provided in a home network, has many operational problems, such as connection delay and emergency number management on a global scale.

For example, it is an issue to allow, an emergency call or the like transmitted to IMS by S8HR from an international roaming destination, to be call-connected to a connection destination in accordance with a location where a subscriber is located accurately. In Non-Patent Literatures 1 and 2 and the like, there is not described any means for solving these problems.

The present invention has been made in view of the above issue, and it is an object of the present invention to provide an apparatus, a method, and a terminal, each of which makes it possible to connect a call from a roaming destination to be accurately and efficiently to a connection destination according to a location where a calling subscriber is located.

According to one aspect of the present invention, there is provided a communication apparatus comprising: a location information acquisition unit configured to acquire location information of a terminal; a reception unit configured to receive a call request transmitted by the terminal; a service identification unit configured to identify a service of the request based on the location information of the terminal and a destination telephone number of the request; and a transmission unit that transmits a response to the terminal when the service of the request cannot be provided.

According to another aspect of the present invention, there is provided a terminal comprising: a transmission unit that transmits a call request to a first communication apparatus; a reception unit that receives a response including indication that the request is not accepted and information indicating a service of the request identified by the communication apparatus, and a retransmission unit that selects, based on the information included in the response, a second communication apparatus belonging to a domain other than a domain to which the first communication apparatus belongs, and a transmits to the second communication apparatus a call request for receiving provision of the service of the request.

According to still another aspect of the present invention, there is provided a communication method by a communication apparatus, comprising:

acquiring location information of a terminal; receiving a call request transmitted by the terminal; specifying a service of the request based on the location information of the terminal and a destination telephone number of the request; and transmitting a response to the terminal when the service of the request cannot be provided.

According to one aspect, there is provided a communication system including the communication apparatus according to the one aspect and at least one terminal according to the another aspect.

According to still another embodiment, there is provided a program causing a communication apparatus to execute:

a location information acquisition processing to acquire location information of a terminal; a reception processing to receive a call request transmitted by the terminal; a service specifying processing that identifies a service of the request based on the location information of the terminal and a destination telephone number of the request; and a transmission processing that transmits a response to the terminal when the service of the request cannot be provided.

According to still another aspect of the present invention, there is provided a program causing a terminal to execute:

a reception processing that receives a response including indication that a request is not accepted and information indicating a service of the request identified by the communication apparatus; and a retransmission processing that selects, based on the information included in the response, a second communication apparatus belonging to a domain other than a domain to which the first communication apparatus belongs, and a transmits to the second communication apparatus a call request for receiving provision of the service of the request. According to the present invention, there is provided a recording medium (a semiconductor memory, a magnetic disk, a CD (Compact Disc), a DVD (Digital Versatile Disc), or the like) in which the program is recorded.

The present invention makes it possible to connect a call from a roaming destination accurately and efficiently according to a location where a calling subscriber is located. Still other features and advantages of the present invention will become readily apparent to those skilled in this art from the following detailed description in conjunction with the accompanying drawings wherein only exemplary embodiments of the invention are shown and described, simply by way of illustration of the best mode contemplated of carrying out this invention. As will be realized, the invention is capable of other and different embodiments, and its several details are capable of modifications in various obvious respects, all without departing from the invention. Accordingly, the drawing and description are to be regarded as illustrative in nature, and not as restrictive.

DETAILED DESCRIPTION

Figure 1:
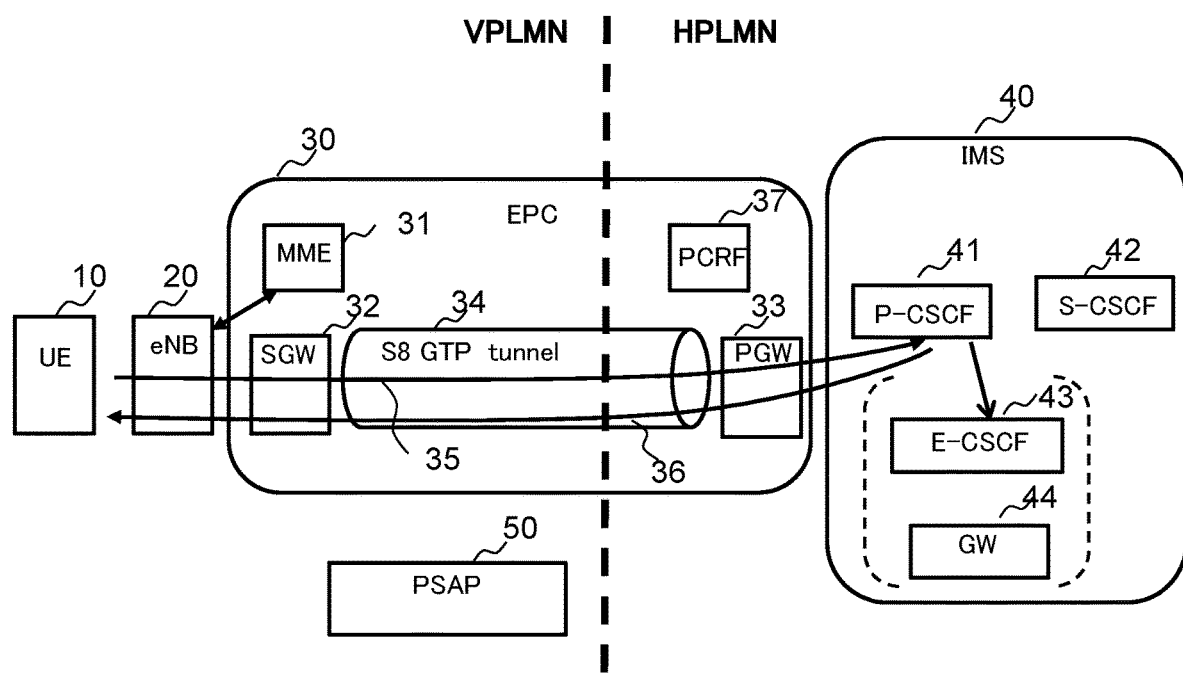
FIG. 1 is a diagram illustrating an example of a system configuration according to an example embodiment of the present invention.

The following describes example embodiments of the present invention. FIG. 1 is a diagram for explaining one example embodiment of the present invention. It is assumed that a terminal (UE) 10 belonging to a HPLMN is roaming out (LTE roaming-out) to a VPLMN side. It is also assumed that the terminal (UE) 10 has call modes of, for example, VoLTE and a third-generation mobile phone system (3G: 3rd Generation), and the call mode is set to VoLTE priority. Upon power-on, the terminal (UE) 10 makes a location registration request to an MME (Mobility Management Entity) 31 of an EPC 30 via an evolved Node B (eNB) 20. The MME 31 performs location registration of the terminal (UE) 10 in cooperation with an HSS (Home Subscriber Server). The MME 31 acquires subscriber information of the terminal (UE) 10 including an APN (Access Point Name) for VoLTE, for example, from the HSS, and based on the APN for VoLTE, determines a PGW (PDN (packet data network) gateway) 33 to be connected. When the MME 31 transmits to an SGW (Serving gateway) 32, a bearer setting request between the SGW 32 and the PGW 33, the SGW 32 sets a bearer for the PGW 33. As a result, as shown in FIG. 1, a GTP (GPRS (General Packet Radio Service) Tunneling Protocol) tunnel 34 (S8 GTP tunnel) is established at the S8 interface between the SGW 32 and the PGW 33 on the VPLMN side. The SGW 32 transmits and receives user data to and from the base station 20, and sets and releases a communication path between the SGW 32 and the PGW 33. The PGW 33 is connected to a packet data network (PDN) such as the IMS 40 or the Internet. The PGW 33 assigns an IP address to the terminal (UE) 10 and further specifies an address of a P-CSCF 41 of the IMS 40 to be connected to the terminal (UE) 10. The PGW 33 transmits a bearer setting response between the SGW 32 and the PGW 33 to the MME 31 via the SGW 32. The address of the P-CSCF 41 is transmitted from the MME 31 to the terminal (UE) 10 via the base station 20 as an attach completion response.

As described above, the terminal (UE) 10 registers itself (attach) to the EPC 30 after powered on. In this attachment procedure, the EPC 30 performs location registration of the terminal (UE) 10, assignment of an IP address to the terminal (UE) 10, and establishment of a communication path (bearer) for sending and receiving SIP messages. After the attachment procedure is completed, the terminal (UE) 10 registers itself to the IMS 40 by sending a SIP message (REGISTER) to a P-CSCF 41. When the terminal (UE) 10 uses an IMS service after completion of the registration of the terminal (UE) 10 with the EPC 30 and the IMS 40, the terminal (UE) 10 transmits and receives SIP messages to and from the IMS 40 to establish a communication session. In FIG. 1, it is assumed that the terminal (UE) 10 performs attachment procedure on the VPLMN side and has completed registration to the IMS 40 on the home network (HPLMN) side.

In a case where the terminal (UE) 10 belonging to the HPLMN is in a state where the call mode thereof is set to VoLTE priority and a data roaming is set on, on the VPLMN side, when the terminal (UDE) 10 issues an emergency call of the telephone numbers 110 or 119, a SIP message (INVITE request) 35 is transmitted from the terminal (UE) 10 to the P-CSCF 41 of the IMS 40 on the home network (HPLMN).

When in the terminal (UE) 10 belonging to the HPLMN, which is Japan, the telephone number 119 or the like is dialed on the HPLMN side, the terminal (UE) 10 performs the following operation. The terminal (UE) 10, when detecting that a dialed telephone number 119 is an emergency call for fire (UE detectable emergency call), sets, to Request-URI of an INVITE request of a SIP message, a fire service emergency service URN: "urn: service: sos.fire". On the other hand, the terminal (UE) 10 whose HPLMN is, for example, the Netherlands or the like, performs the following operation. In a case where in the terminal (UE) 10, in which the correspondence relationship between the emergency service URN in Japan and the emergency service URN is not set, even if the telephone number 119 or the like is dialed in the terminal (UE) 10 on the VPLMN side (for example, Japan), the terminal (UE) 10 cannot detect the telephone number 119 or the like as an emergency call (Non UE detectable emergency call). The terminal (UE) 10 sets the telephone number, as it is, in the Request-URI and transmits the SIP message (INVITE request) 35 to the P-CSCF 41 on the home side.

When the P-CSCF 41 of the IMS 40 receives the SIP INVITE request 35, the P-CSCF 41 recognizes an emergency call origination with S8HR based on location information (P-Access-Network-info header) of the terminal (UE) 10 and a dialed destination telephone number (Request URI). As a result, the P-CSCF 41 of the IMS 40 returns a SIP response (response code: 380) 36 to the terminal (UE) 10. The P-CSCF 41 may acquire the location information of the terminal (UE) 10 by inquiring about other apparatuses arranged in the IMS 40, such as HSS, PCRF and the like. The P-CSCF 41 may recognize the emergency call origination with S8HR, in consideration of information obtained by inquiring to other apparatuses arranged in the IMS 40 such as HSS, PCRF, other information set in the SIP header included in the INVITE request 35 of SIP, or data set in advance in the P-CSCF 41.

A response code of a SIP response is also called a status code. The response code 300 series of the SIP response is a redirection response to ask a user to change the request destination. "380 Alternative Service" means that the specified service cannot be used, but an alternative service exists. As a redirection response of 300-series, 300: Multiple Choices (multiple redirect candidates),
301: Moved Permanently (permanently moving place),
302: Moved Temporarily (temporarily moving place),
305: Use Proxy (SIP proxy use request), and so forth are defined in 21.3 of IETF (Internet Engineering Task Force) RFC (Request For Comments) 3261. The success response to the SIP request is 200-series (OK), and the error is 400-series.

In FIG. 1, the P-CSCF 41 receives an INVITE request 35 from the terminal (UE) 10 and based on location information (P-Access-Network-info header) of the terminal (UE) 10 and a destination telephone number of the Request-URI, determines whether the INVITE request 35 is a call that can be served by the IMS 40. When the P-CSCF 41 determines that the INVITE request 35 is a call that can be served by the IMS 40, the P-CSCF 41 transmits an INVITE request 35 to an E-CSCF 43 without performing a redirection response.

The E-CSCF 43 acquires, for example, cell identification information of a serving cell of the terminal (UE) 10 as the location information of the terminal (UE) 10 via LRF (Location Retrieval Function), and selects a route to the PSAP (Public Safety Answering Point connected on the side of HPLMN. The E-CSCF 43 reports an emergency call via, for example, a gateway (GW: e.g., MGCF (Media Gateway Control Function)) 44.

When the P-CSCF 41 determines that the INVITE request 35 is a call that cannot be served by the IMS 40 based on the location information (P-Access-Network-info header) of the terminal (UE) 10 and the destination telephone number of the Request-URI, the P-CSCF 41 returns a SIP redirection response (380) to the terminal (UE) 10.

The terminal (UE) 10, on reception of the redirection response (380) as the SIP response, performs an emergency call connection in an alternative manner different from the transmission of the IMS emergency call by the IMS provided in the home network (HPLMN). For example, the terminal (UE) 10 makes an emergency call connection at the roaming destination (VPLMN) to connect to the PSAP 50 such as a police/fire department on the VPLMN side.

Although not particularly limited, an example of an alternative method is that the terminal (UE) 10 switches a radio access network from E-UTRAN (Evolved-UMTS (Terrestrial Radio Access Network)) to UTRAN, and may perform dialing of an emergency call. In this case, the terminal (UE) 10 switches from LTE PS (Packet Switched) domain (Packet Switched System) to 3G (3rd Generation) or 2G (2nd Generation) CS (Circuit Switched) domain (Circuit Switched System), and then performs dials an emergency call.

The terminal (UE) 10 may use a CSFB (Circuit Switched Fall Back) that automatically switches to a wireless access scheme in a CS domain such as 3G at the time of voice call, during when the terminal (UE) 10 is being served in LTE. The MME 31 of the EPC 30 is connected to an MSC (Mobile Switching Center) server on the circuit switching network via the SGs interface. CSFB may be realized via this SGs interface.

Figure 2:
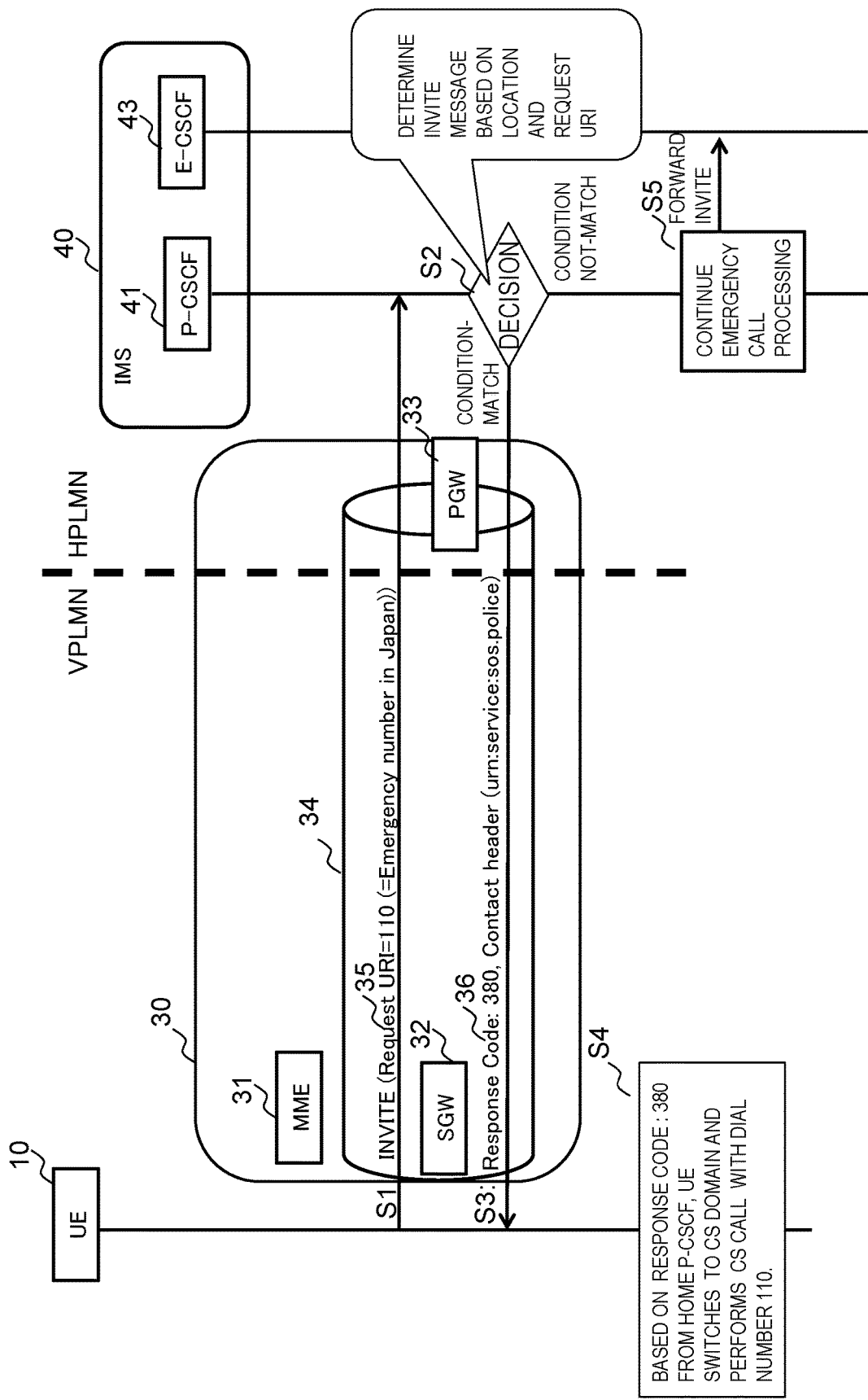
FIG. 2 is a diagram illustrating an operation example of one example embodiment of the present invention.

FIG. 2 is a diagram for explaining an operation of the example embodiment described with reference to FIG. 1. In FIG. 2, the operation of the P-CSCF 41 is illustrated. The terminal (UE) 10, SGW 32 and MME 31 communicate with each other via the base station (eNB) 20 of FIG. 1.

<Step S1>:

A terminal (UE) 10 which camps on a VPLMN side and has a call mode thereof set to VoLTE priority, transmits a SIP INVITE request (INVITE (Request URI=110 (=Emergency number in Japan)) 35 via the base station, to the P-CSCF 41 of the IMS 40 from the PGW 33 on the HPLMN side through the SGW 32 and the GTP tunnel 34.

A request line of the SIP message is composed of SIP method, Request-URI (Uniform Resource Indicator), protocol version name (for example SIP/2.0). In this case, the SIP method is INVITE and the Request-URI is tel: 110. A specific example of a start line (request line) of the SIP message (INVITE request) is as follows.

INVITE tel: 110 SIP/2.0

<Step S2>:

On reception of the SIP message: the INVITE request 35, the P-CSCF 41, based on the location information of the subscriber (for example, the location information obtained from the P-Access-Network-Info header described in Non-Patent Literature 2 7.2A.4, etc.) and the dial number (Request-URI), recognize an emergency call (that is, an emergency call which is a local service is recognized by the P-CSCF 41 of the home network which is not a local apparatus) and decides which one out of the followings to be performed.

Continue processing of the emergency call on the HPLMN side (the emergency call service is possible in the IMS 40) (step S5); or Return to the terminal (UE) 10 a SIP response of a response code: 380 (step S3).

<Step S3>:

When location information of the terminal (UE) 10 and a destination telephone number match a condition (for example, a traveler (user) from the Netherlands of HPLMN stays in Japan, and dials 110 Numbers at a terminal of the traveler (user) in Japan), the P-CSCF 41 returns the SIP response 36 with the response code: 380 to the terminal (UE) 10 via the PGW 33, the GTP tunnel 34, the SGW 32, and the base station. An example of a start line (response line) of the SIP response is as follows.

SIP/2.0 380 Alternative Service

Urn (Uniform Resource Name): service: sos. police is set in a contact of a header of the SIP response (designate a destination of the subsequent request: contact header). In addition, in order to clearly indicate that it is an emergency call, "emergency" is set in the <type> child element of the 3GPP IM CN subsystem XML body part of the SIP response (indicating to treat a subsequent request as an emergency call).

Upon reception of this SIP response, the terminal (UE) 10 retransmits, as an emergency call (UE detectable emergency call), an INVITE request with a Request-URI in which is set the destination (such as urn: service: sos. police) of the subsequent request specified in the contact header of the SIP response.

The terminal (UE) 10, upon reception of the SIP response with a response code: 380, normally transmits to the P-CSCF 41 of the IMS 40 the INVITE request of the following request line, automatically.

INVITE urn:service:sos.police SIP/2.0

However, even if the terminal (UE) 10 retransmits the INVITE request, the P-CSCF 41 of the IMS 40 again returns a SIP response with the response code: 380 to the terminal (UE) 10.

For example, when handling of a service of the roaming destination Service URN (e.g., urn: service: sos. police) for the roaming destination terminal (UE) 10 cannot be performed by the IMS 40 to which the P-CSCF 41 belongs, the P-CSCF 41 transmits a SIP response with a response code: 380 to the terminal (UE) 10.

Information as to whether or not handling of the service can be performed by the IMS 40 may be held in the P-CSCF 41, for example, or may be held in an external database or the like. Information as to whether or not the handling of the service can be performed by the IMS 40 may include, for example, any one of:

Presence/absence of roaming of terminal;
Roaming countries;
Roaming area; and
Service type (sos.police, sos.fire etc.), or
any combination of the above items. Information on whether or not the handling of the service may be performed by the IMS nay be set in advance in the P-CSCF 41 or an external database.

<Step S4>:

In the present embodiment, the terminal (UE) 10 on a roaming destination does not retransmit the INVITE request designating the destination (Service URN) specified in the contact header of the SIP response 36 with the response code: 380, but the terminal (UE) 10 switches a voice call from an LTE PS (Packet Switched) domain to a 3G CS (Circuit Switched) domain, and makes a CS call with the telephone number 110. In this case, it is necessary that the LTE service area and the 3G service area overlap each other. In accordance with the information (contact header, <type> child node element(s) of 3 GPP IM CN subsystem XML body part, etc.) obtained on reception of the SIP response 36 of the response code: 380, the roaming destination terminal (UE) may control a domain to be switched and the parameters included in the calling signal.

Figure 3:
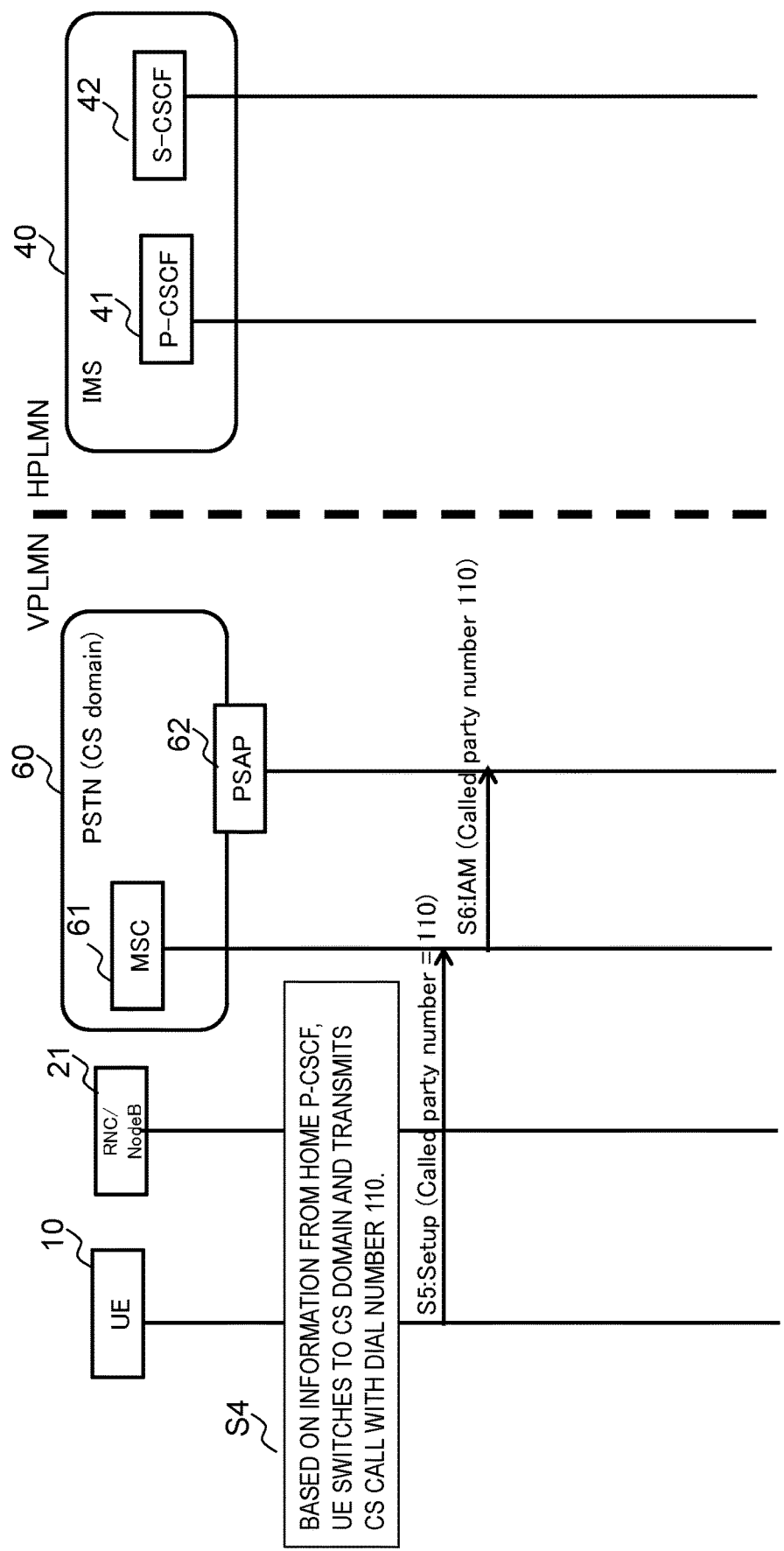
FIG. 3 is a diagram illustrating an operation example of the example embodiment of the present invention.

FIG. 3 is a diagram for explaining an operation when the terminal (UE) 10 transmits an emergency call in the CS domain of an VPLMN. Step S4 of FIG. 3 corresponds to step S 4 of FIG. 2. Therefore, the description of step S 4 in FIG. 3 is omitted. In the following description, it is assumed that the terminal (UE) 10 can succeeds in finding a 3G base station (Node B) by performing a cell search.

<Step S5>:

The terminal (UE) 10 transmits a call setting message SETUP (Called party number=110) for making a switched line connection request to the MSC 61 (Public Switched Telephone Networks) of a PSTN (Public Switched Telephone Networks) 60 via the base station Node B/RNC (Radio Network Controller). The MME 31 of the EPC 30 in FIG. 1 and the MSC 61 in FIG. 3 may be connected via SGs interface. The call setting message SETUP includes information elements of a calling party number and a Called party number. The MSC 61 has a call control function of a terminal (UE) 10 which is a mobile station and a mobility management function accompanying movement of the terminal (UE) 10.

<Step S6>:

The MSC 61 transmits an IAM (Initial Address Message) of ISUP (Integrated Services Digital Network User Part) to the PSAP 62. The IAM is a message requesting connection of a line to a designated party, and includes a calling party number and a called number.

In step S4 to step S5 of FIG. 3, the roaming destination terminal (UE) 10, on reception of the SIP response 36 with a response code: 380, switches to a voice call by the CS domain and performs CS call with a telephone number 110. However, when the roaming destination terminal (UE) 10 receives the SIP response 36 with the response code: 380, instead of performing the step S 4 to the step S 5 of FIG, may activate "High Level Procedures for IMS Emergency Services" that is defined in 7.1 section of the non-Patent Literature 1, and may switch to the PS domain of the VPLMN network. In that case, An IP-CAN (IP Connectivity Access Network) and IMS defined in Non-Patent Literature 1 are all set in a VPLMN network.

Figure 4:
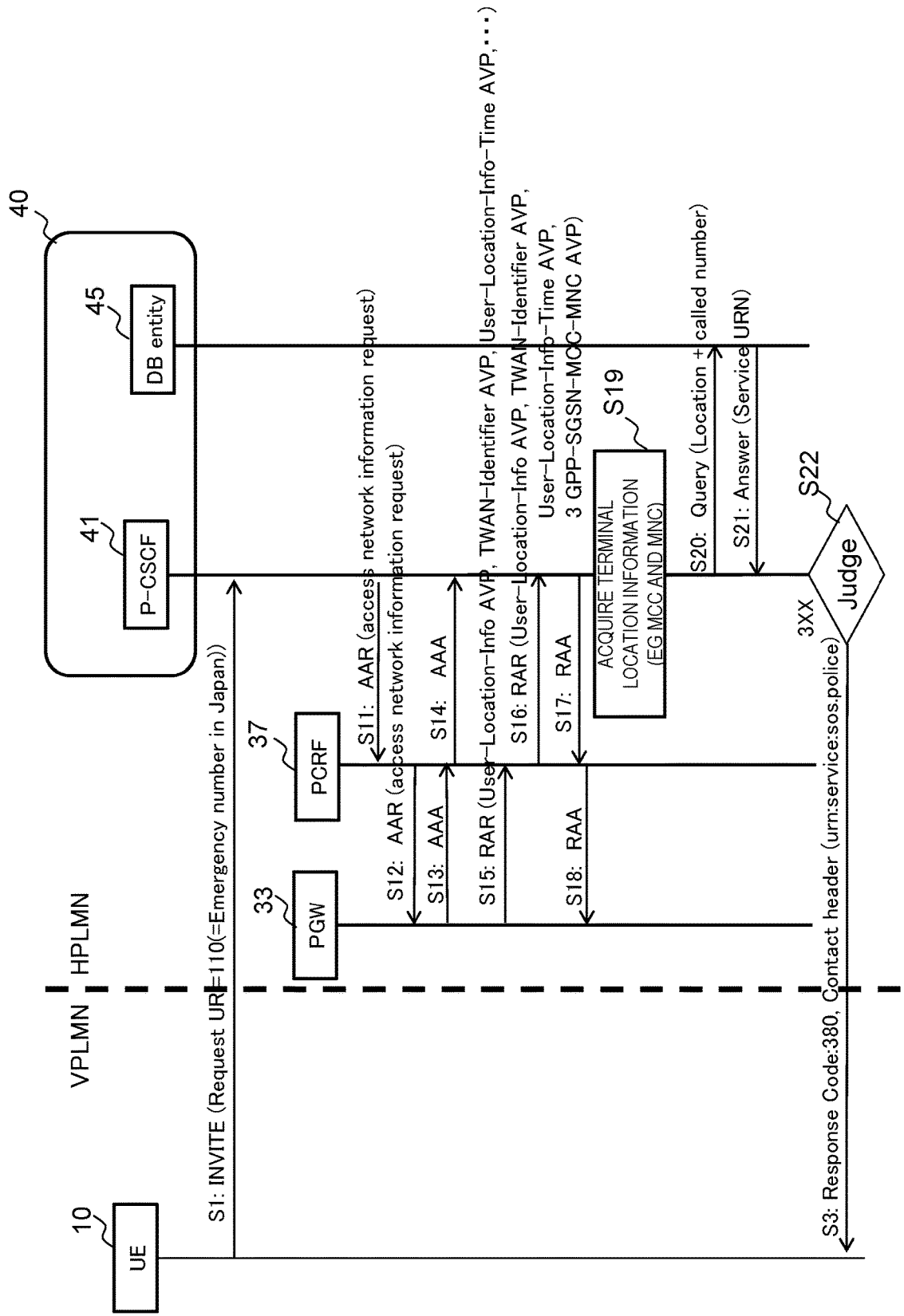
FIG. 4 is a diagram illustrating a detailed example of the operation of step S2 in FIG. 2.

FIG. 4 is a diagram for explaining the operation of the example embodiment described with reference to FIG. 2. FIG. 4 illustrates an example of the details of step S2 in FIG. 2 of the P-CSCF 41 (judgment: whether or not handling of an emergency call can be performed by IMS). The PGW 33 in FIG. 4 communicates with the terminal (UE) 10 via the base station (eNB) as in FIG. 1.

<Step S1>

In step S1, the terminal (UE) 10 transmits a SIP message (INVITE, Request-URI=110) to the P-CSCF 41 via the base station (eNB). This step S1 is the same as the step S1 of FIG. 2, so its explanation will be omitted.

The P-CSCF 41, on reception of the SIP message (INVITE request, for example, emergency session establishment request), in cooperation with the PCRF 37, acquires user location information provided on the network side.

<Step S11>

Upon reception of the INVITE request, the P-CSCF 41 transmits an AAR (AA-Request) command to the PCRF 37 on the home network side. In AAR, an access network information request is specified.

<Step S12>

The PCRF 37 transmits the AAR command to the PGW 33.

<Steps S13, S14>

The PGW 33 returns to the PCRF 37 an AAA (AA-Answer) command which is a response of the AAR. The PCRF 37 returns the AAA command to the P-CSCF 41. Regarding command formats of AAR and AAA, for example, there is description in 5.6.1, 5.6.2 etc. of 3GPP TS 29.214 (V 13.1.0 (2015-03)) referred to by Non-Patent Literature 2 (Section 5.2).

<Steps S15, S16>

The PGW 33 transmits a RAR (Re-Authorization-Request) to the P-CSCF 41 via the PCRF 37. In the RAR, as user location information provided on the network side, User-Location-Info AVP, TWAN (Trusted WLAN Access Network)-Identifier AVP, User-Location-Info-Time AVP, 3GPP-SGSN (Serving GPRS Gateway Node)-MCC (Mobile Country Code)-MNC (Mobile Network Code) AVP, and so forth are included.

As described above, the user-location-Info AVP of the RAR from the PCRF 37 includes the location information of the terminal (UE) 10 that can specify the country and the area.

The AVP (Attribute Value Pair) is a format of information used when a RADIUS (Remote Authentication Dial-In User Service) protocol for authentication and charging management of the terminal (UE) 10 transmits and receives user information and the like. A TWAN-Identifier is a trusted WLAN (Wireless Local Area Network) identifier. MCC is a code of an operation area (country). MNC is a code (telecommunications number) for identifying a telecommunications carrier.

<Steps S17, S18>

The P-CSCF 41 returns, to the PGW 33 via the PCRF 37, RAA which is a response of the RAR. Regarding command formats of RAR and RAA, for example, there is description in 5.6.3, 5.6.4 and etc. of 3GPP TS 29.214 (V 13.1.0 (2015-03)) referred to by Non-Patent Literature 2 (Section 5.2.1).

<Step S19>

The P-CSCF 41 acquires location information of the terminal (UE) 10 from the User-Location-Info AVP of the RAA. For example, the P-CSCF 41 acquires MCC and MNC of the terminal (UE) 10. It is noted that the P-CSCF 41 may acquire the location information of the terminal (UE) 10 by performing inquiry to other apparatuses arranged in the IMS 40, such as HSS.

<Step S20>

The P-CSCF 41 sends to a DB entity (database entity) 45 an inquiry (Query) for acquiring a service type and service availability corresponding to the location information of the terminal (UE) 10 and the dial number (Request-URI).

The DB entity 45 stores and retains fields of, for example,

Location information (for example, country, region), jurisdiction over which has a communication carrier of the roaming destination with which a communication carrier of the home network (HPLMN) cooperates, Emergency special number at the location, Service type corresponding to the emergency special number (Service URN)

Correspondence of availability of applicable service, and so forth. The service type (Service URN) corresponding to the emergency special number and the like is prescribed in IETF RFC 5031, for example.

The terminal (UE) 10 may stores and retains one or more candidate domains for selection by the terminal (UE) 10 in preparation for selection of another domain by the terminal (UE) 10 when the corresponding service cannot be provided.

In addition, the DB entity 45 may be disposed inside the apparatus of the P-CSCF 41 or may be arranged in another external apparatus as illustrated in FIG. 4. In the case where the P-CSCF 41 is arranged in another external apparatus, Query and Answer may be realized by the SIP protocol. For example, the P-CSCF 41 may make an inquiry to the DB entity 45 using an INVITE request of the SIP message. Response code: 380 or 300 (Multiple Choices) or the like may be used for an answer from the DB entity 45.

First, the DB entity 45 outputs a service type (Service URN) corresponding to the location information and the dial number (Request-URI) of the terminal (UE) 10 included in the Query from the P-CSCF 41.

Next, the DB entity 45 outputs whether the service for the location information of the terminal (UE) 10 and the service type (Service URN) can be provided or not.

For example, in a case the DB entity 45 is configured such that the DB entity 45 outputs that the IMS 40 in HPLMN of Japan cannot provide a French police emergency call service to a terminal (UE) 10 in a VPLMN of France but the IMS 40 can provide a French fire service emergency call service, an example of information held in DB entity 45 is as shown in Table 1 below.

TABLE 1

| Query IN | Answer OUT |
| --- | --- |
| France + urn:service:sos.police | Unavailable |
| France + urn:service:sos.fire | Available |

Further, for example, in addition to Table 1, in a case where the terminal (UE) 10 is notified of a domain candidate so that the terminal (UE) 10 selects a PS domain or CS domain of VPLMN, when the service provision is impossible, an example of information held in DB entity 45 is as shown in Table 2 below.

TABLE 2

| Query IN | Answer OUT |
| --- | --- |
| France + urn:service:sos.police | Unavailable + "VPLMN-PS/CS" |
| France + urn:service:sos.fire | Available |

<Step S21>

The P-CSCF 41 receives an answer from the DB entity 45. The answer may include a service identifier (Service URN), availability of the service, and (if necessary) a domain candidate selected by the terminal (UE) 10.

<Step S22>

Based on the answer from the DB entity 45, the P-CSCF 41 can determine whether the IMS 40 can handle the emergency call service.

<Step S3>

This step S3 is the same as the step S3 in FIG. 2. When the call processing (handling) of the emergency call is impossible, the P-CSCF 41 sets the Service URN (urn: service: sos.police) answered in the step S21 to a contact of a header of a SIP response of the response code: 380 and returns the SIP response to the terminal (UE) 10 via the base station. The P-CSCF 41 includes, in the SIP response, a candidate code of a domain to be selected by the terminal (UE) 10 (if necessary). The candidate code may be a unit grouping a plurality of domains, such as "HPLMN domain", or may indicate a domain which the terminal (UE) 10 should not select. For example, the candidate code may be a code for notifying that sending of an emergency call is impossible in the domain on the HPLMN side.

Upon reception of the SIP response message transmitted in step S3, the terminal (UE) 10 executes the process of step S 4 in FIG. 2 and FIG. 3 (switching to the CS domain and transmitting an emergency call).

In step S3, when a domain candidate selected by the terminal (UE) 10 is specified in the SIP response, the terminal (UE) 10 switches to the designated domain and performs the emergency call.

Another example of database information held by the DB entity 45 is shown below. The P-CSCF 41 may input only the dialed number (Called number) to the DB entity 45 without specifying the location information in the query of step S20 in FIG. 4. In this case, the DB entity 45 replies to the P-CSCF 41 a list of country information and Service URN. The P-CSCF 41, from the received list, selects a Service URN corresponding to the location information of the terminal (UE) 10.

In the above-described example embodiment, the terminal (UE) 10 is assumed to be an LTE/3G compatible terminal (UE) 10 capable of setting a voice mode to VoLTE, capable of setting data roaming function to an on state, and also capable of switching to the CS domain of VPLMN (LTE/ UE) 10. The terminal (UE) 10 may be a smartphone, a tablet terminal, or the like.

In the present embodiment, as described above,

1) When the terminal (UE) 10 transmits the INVITE request 35 in step S1 of FIG. 2, the terminal (UE) 10 receives the SIP response 36 of a response code: 380 from the P-CSCF 41.

2) When the terminal (UE) 10 receives the SIP response 36 with the response code: 380, as described above, the SIP INVITE request for which the Service URN is set in the Request-URI is transmitted again to PS (Packet Switched) Network, without switching of the domain. As a result, the terminal (UE) 10 again receives the SIP response with the response code: 380 from the P-CSCF 41. This is because the P-CSCF 41 determines that handling of the service is impossible with the IMS, as described above.

3) Upon reception of the second response code 380, the terminal (UE) 10 switches to the CS domain in step S 4 of FIGS. 2 and 3, dials an emergency call, and succeeds in a call connection to the PSAP 62 (FIG. 3). In the present embodiment, preferably, the step 2) is omitted.

For example, if the terminal (UE) 10 recognizes that it is currently in a state of S8HR roaming and recognizes that an emergency call is dialed, the above step 2) is omitted. That is, as shown in FIG. 2, when the terminal (UE) 10 receives the SIP response of the response code: 380 from the P-CSCF 41 in step S3, the terminal (UE) 10 switches to the CS domain in step S 4.

Alternatively, the P-CSCF 41 sets in the SIP response to be transmitted to the terminal (UE) 10 in step S3, a code for notifying that transmission of an emergency call by VoLTE from the VPLMN side to the HPLMN side (packet network) is impossible, and when the terminal (UE) 10 detects this code at the terminal (UE) 10, the above step 2) may be omitted.

Figure 5:
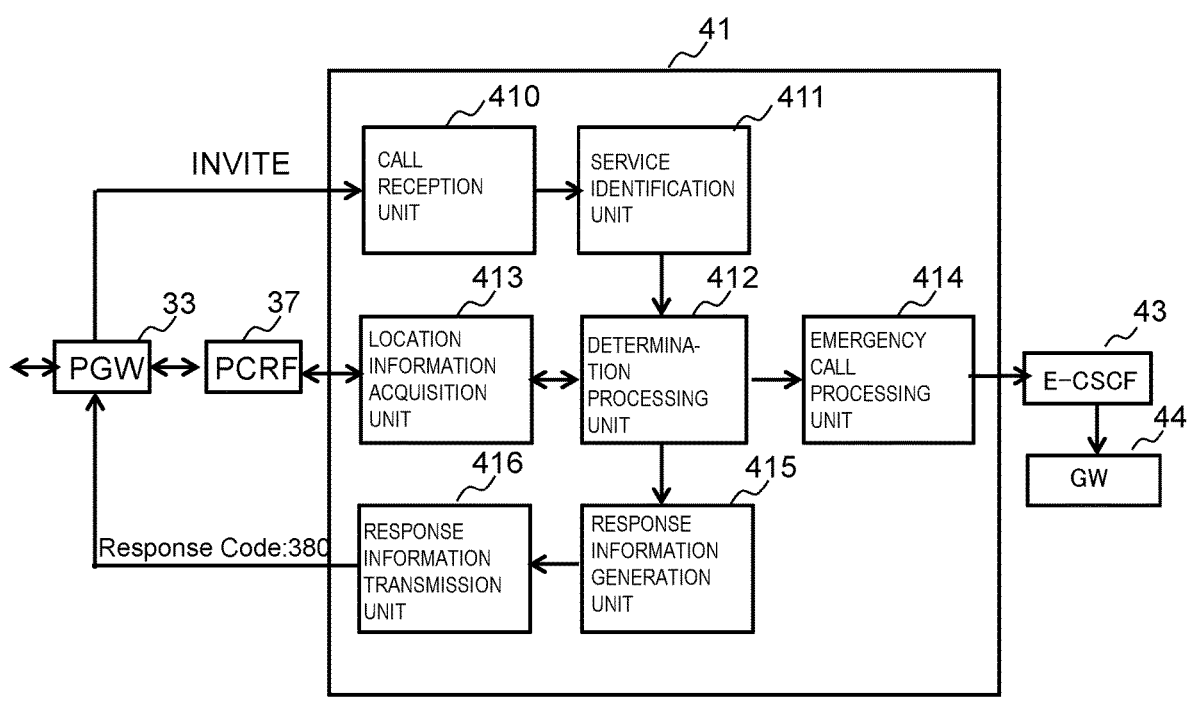
FIG. 5 is a diagram illustrating an example of a configuration of a P-CSCF according to the example embodiment of the present invention.

FIG. 5 is a diagram illustrating a configuration example of the P-CSCF 41 of FIG. 1. Referring to FIG. 5, the P-CSCF 41 includes a call reception unit 410, a service identification unit 411, a determination processing unit 412, a location information acquisition unit 413, an emergency call processing unit 414, a response information generation unit 415, and a response information transmission unit 416.

The call reception unit 410 receives a SIP message (INVITE request) transferred from the terminal (UE) 10 of FIG. 1 via the S8HR (S8GTP tunnel), and transmits the SIP message (INVITE request) to the service identification unit 411.

Based on Request-URI information of the SIP message (INVITE request), the service identification unit 411 identifies a service of the call (for example, whether it is an emergency service). In the case of the emergency service, the service identification unit 411 forwards the INVITE request to the determination processing unit 412.

When a called number is specified in the Request-URI information of the INVITE request, the determination processing unit 412 requests the location information acquisition unit 413 to acquire location information of the terminal. The location information acquisition unit 413 transmits an AA request to the PCRF 37 as described above, and acquires the location information of the terminal (UE) 10 from the PWG 33 (steps S11 to S18 of FIG. 4). The location information acquisition unit 413 requests the PCRF 37 to acquire location information, without using the location information of the terminal (UE) 10 transmitted from the terminal (UE) 10, and acquires the subscriber location information managed on the network side. This is because the location information transmitted from the terminal (UE) 10 is not necessarily trusted.

The determination processing unit 412 requests the response information generation unit 415 to generate response information, when it determines that handling of the emergency call by the IMS 40 cannot be performed based on the location information of the terminal (UE) 10 and the called number of the emergency call (received destination telephone number (called number)) (step S2 in FIG. 2, step S22 in FIG. 4).

The response information generation unit 415 performs an inquiry of step 20 of FIG. 4 and generates, based on a reply acquired from DB entity 45 in step S21 of FIG. 4, redirect destination information (destination of INVITE request) to be set in the contact of the SIP response of response code: 380. The response information generation unit 415 may generate information notifying the domain connectable by the terminal (UE) 10. The response information generation unit 415 may generate information notifying a domain to which the terminal (UE) 10 cannot be connected to.

The response information transmission unit 416 transmits the SIP response of the response code: 380 to the terminal (UE) 10 on the VPLMN side via the PGW 33 on a home side. The response information transmission unit 416 transmits to the terminal (UE) 10, information for notifying the domain connectable by the terminal (UE) 10 and/or information for notifying the domain (UE) 10 unconnectable by the terminal (UE) 10. The response from the response information transmission unit 416 may be such that the P-CSCF 41 notifies to the terminal (UE) 10 that connection from the P-CSCF 41 to a PS network (Packet Switched Network) such as IMS is impossible, or connection via a wireless LAN (Local Area Network) such as Wi-Fi (Wireless Fidelity: registered trademark) to the PS network is impossible. In FIG. 5, the call reception unit 410, the service identification unit 411, the determination processing unit 412, and the location information acquisition unit 413 correspond to a first means (unit) that on reception of a call request transmitted by the terminal (UE) 10, based on a location of and a destination telephone number of the request, identifies a service of the request and determines whether to accept or reject the request to provide the service of the request. The response information generation unit 415 and the response information transmission unit 416 correspond to a second unit (unit) that notifies the terminal (UE) 10 of a response including a determination result by the first means (unit).

At least a part of the service identification unit 411, the determination processing unit 412, the location information acquisition unit 413, the emergency call processing unit 414, the response information generation unit 415, and the response information transmission unit 416 may be implemented by a program executed on a computer constituting the P-CSCF 41.

Figure 6:
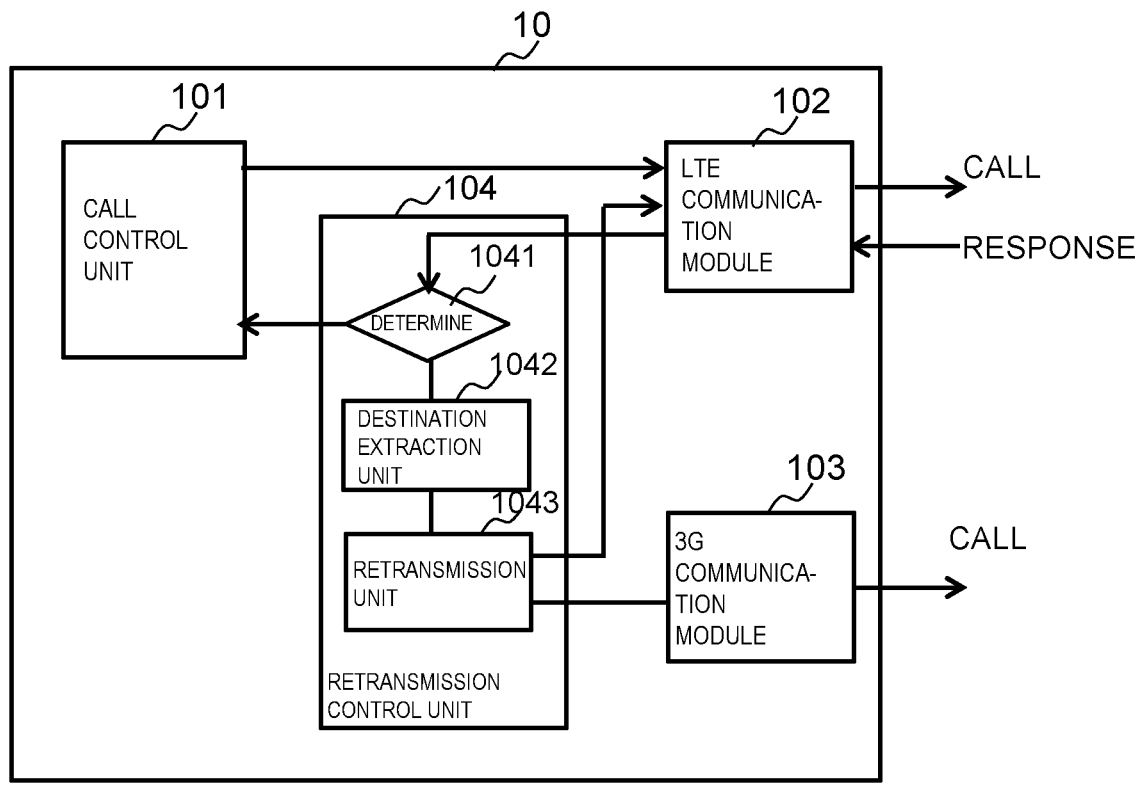
FIG. 6 is a diagram illustrating an example of a configuration of a terminal according to the example embodiment of the present invention.

FIG. 6 is a diagram illustrating a configuration example of one example embodiment of the terminal (UE) 10 described with reference to FIGS. 1 to 4.

Referring to FIG. 6, the terminal (UE) 10 includes a call control unit 101 that performs call control of call origination and termination, an LTE communication module 102 that performs LTE communication, 3G (3rd Generation) communication module 103 and a re-transmission control unit 104 that controls re-transmission of an emergency call.

The retransmission control unit 104 includes a determination unit 1041 that determines whether or not the SIP response from the P-CSCF to the emergency call (INVITE request of the SIP message) transmitted from the LTE communication module 102 is a response including the response code: 380, a destination extraction unit 1042 that extracts a redirect destination (destination) of the call designated by a contact of the SIP response when the response code is 380 SIP response, and a retransmission unit 1043 that retransmits an emergency call to the redirect destination (transmission destination) when the redirect destination is a VPLMN which is a roaming destination of the terminal (UE) 10. In the case where the redirect destination designated by the contact of the SIP response is a CS domain, the retransmission destination of the emergency call by the retransmission unit 1043 is the 3rd Generation (3G) communication module 103. The 3G communication module 103 re-transmits the call. When the redirect destination designated by the contact of the SIP response is a PS domain and the PS domain supports an emergency call, the retransmission destination of the emergency call by the retransmission unit 1043 is the LTE communication module 102. The LTE communication module 102 re-transmits the call (INVITE request). Processing of the re-transmission control unit 104 and at least a part of the other units 102 to 103 may, as a matter of course, be implemented by a program (recorded in a computer-readable recording medium) operating on a computer of the terminal (UE) 10.

The terminal (UE) 10 may include a wireless LAN communication module, such as Wi-Fi, in place of or in addition to the 3G communication module 103, and may transmit (or retransmit) an emergency call from a wireless LAN communication module such as Wi-Fi.

For example, as the redirect destination indicated by the response of the response code: 380 from the P-CSCF 41 (the connection destination to which the terminal (UE) 10 may be connected), the following may be listed.

CS domain of VPLMN (2G/3G: when supported by VPLMN),

PS domain of VPLMN (P-CSCF in VPLMN through LTE: when supported by VPLMN)

PS domain of VPLMN (P-CSCF in VPLMN via Wi-Fi: when supported by VPLMN)

PS domain of HPLMN (P-CSCF in HPLMN via LTE),

PS domain of HPLMN (P-CSCF in HPLMN via Wi-Fi), any domain in VPLMN selected by the terminal, and any domain selected by the terminal.

Figure 7:
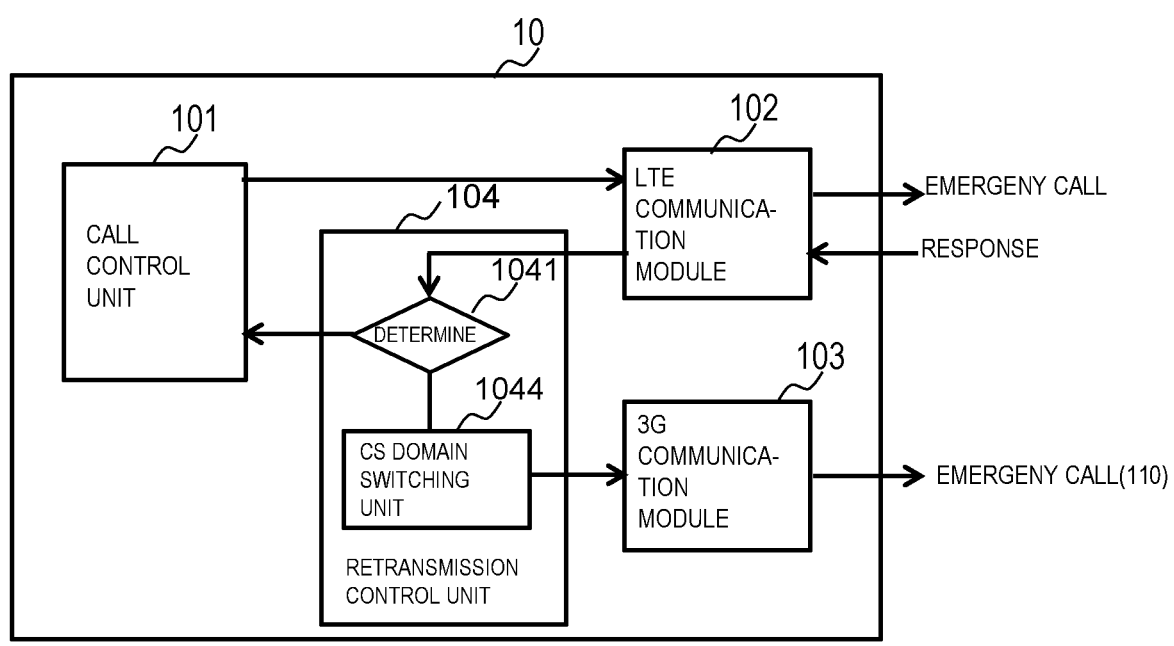
FIG. 7 is a diagram illustrating another example of the configuration of a terminal according to the example embodiment of the present invention.

FIG. 7 is a diagram illustrating a configuration example of another example embodiment of the terminal (UE) 10 described with reference to FIGS. 1 to 4. In this example embodiment, unlike the configuration of FIG. 6, the terminal (UE) 10, on reception of a redirect response with a response code: 380 from the P-CSCF 41, does not make a call to a destination designated by the redirect response, but switches from LTE to CS domain connection.

In FIG. 7, the terminal (UE) 10 includes a call control unit 101 that performs call control of call origination and termination, an LTE communication module 102 that performs LTE communication, 3G (3rd Generation) communication module 103 and a re-transmission control unit 104 that controls the re-transmission of an emergency call. In addition to the LTE communication module 102 and the 3G communication module 103, the terminal (UE) 10 may further includes a wireless LAN communication module such as Wi-Fi (registered trademark) and transmits an emergency call from the wireless LAN communication module such as Wi-Fi.

The retransmission control unit 104 includes a decision unit 1041 that decides whether or not the response to the emergency call dialed from the LTE communication module 102 is a response code: 380, a CS domain switching unit 1044 that performs switching to the CS domain in the case where the response to the emergency call dialed from the LTE communication module 102 is the response code: 380. At least a part of the processing of the re-transmission control unit 104 and the other units 102 to 103 may, as a matter of course, be realized by a program (computer-readable recording medium), wherein the program is executed operating on the computer of the terminal (UE) 10.

For example, when the retransmission control unit 104 recognizes that the terminal (UE) 10 is currently under a condition of S8HR, dials out, and then receives the SIP response of the response code: 380, the retransmission control unit 104 may switches from the LTE communication module 102.

When information notifying that an emergency call cannot be dialed from a VPLMN side to a HPLMN side (packet network) is set in the SIP response of the response code: 380 from the P-CSCF 41, the re-transmission control unit 104 may switches from the LTE communication module 102 to the CS domain. Alternatively, not only the CS domain, but also any other domain in the VPLMN may be switched to.

In the above example embodiment, the emergency call service transmitted from an overseas roaming destination to a home network of a terminal has been described. However, the example embodiments can be applied to various services, such as weather forecast, time notification, and telephone number guide.

That is, as described above, the emergency session establishment request is routed to the P-CSCF 41 located in the home network (S8HR roaming). The home network detects whether the session is an emergency service and indicates that an emergency session is initiated in a visited network where the terminal (UE) 10 is served (CS domain, for example), as a response to the terminal (UE) 10. The P-CSCF 41 located in the home network (HPLMN) may be configured to reject session initiation request for non-emergency local services (for example, weather forecast, time notification, etc.) as well as emergency call (emergency sessions). Procedures between the P-CSCF 41 and the terminal (UE) 10 are not limited to those described in the above example embodiments, and various other methods may, as a matter of course, be applied.

The P-CSCF 41 may reject the session initiation request indicating that it is an emergency call (emergency session). As an option, the P-CSCF 41 may indicate initiation of an emergency call (emergency session) via a domain (CS domain, PS domain via LTE access, and/or PS domain via Wi-Fi (registered trademark) access, etc.) of a visited network (VPLMN) in which the terminal (UE) is served.

When the terminal (UE) 10 receives a session rejection from the P-CSCF 41, and when there exists an instruction from the P-CSCF 41 (the terminal should start an emergency session in the visited network (VPLMN), the terminal (UE) 10 may be configured to select a domain for an emergency call according to the instruction. That is, upon reception of the instruction from the P-CSCF 41, the terminal (UE) 10 may select a domain (CS domain, PS domain via LTE access, and/or PS domain via Wi-Fi (registered trademark) access, etc.) of a visited network (VPLMN) in which the terminal (UE) is served.

Various methods may be applied to a configuration or the like in which the P-CSCF 41 in the HPLMN for the terminal UE (10) that is roaming (S8HR roaming), approves continuation of a session initiation request of an emergency call from the terminal.

The above example embodiments may be also summarized for example, as Supplementary Notes listed below (but not limited to those below).

(Supplementary Note 1)

A communication apparatus comprising means for detecting that a request from a terminal is a local service based on a location of the terminal.

(Supplementary Note 2)

The communication apparatus according to supplementary note 1, wherein the local service is an emergency service.

(Supplementary Note 3)

The communication apparatus according to supplementary note 1 or 2, wherein the communication apparatus is arranged in a different network from the terminal, and is connected to the terminal via a tunnel.

(Supplementary Note 4)

The communication apparatus according to any one of supplementary notes 1 to 3, wherein the request is one that the terminal cannot detect that the request is a local service.

(Supplementary Note 5)

The communication apparatus according to any one of supplementary notes 1 to 4, further comprising means for judging whether to accept or refuse the request to provide the request and notifying the terminal of a response including a judgment result.

(Supplementary Note 6)

A communication apparatus comprising means that, upon reception of a call request transmitted by a terminal, identifies a service of the request based on a location of the terminal and a destination telephone number of the request, determines whether to accept the request to provide the service of the request or rejects the request, and notifies the terminal of a response including a result of the determination.

(Supplementary Note 7)

The communication apparatus according to supplementary note 6, comprising means for returning a redirect response designating the service of the request identified by the communication apparatus as a redirect destination information of the request to the terminal when making a response notifying the rejection.

(Supplementary Note 8)

The communication apparatus according to supplementary note 7, comprising means that when making a response notifying the rejection, returns to the terminal a redirect response indicating a connectable or unconnectable domain to receive provision of a service of the request identified by the communication apparatus.

(Supplementary Note 9)

The communication apparatus according to any one of supplementary notes 6 to 8, wherein the communication apparatus includes an apparatus controlling a call of IMS (IP (Internet Protocol) Multimedia Subsystem) belonging to a PS (packet exchange) domain on a home network side, which receives the request transmitted by the terminal at a roaming destination in a call mode of VoLTE (Voice over LTE (Long Term Evolution) Protocol).

(Supplementary Note 10)

The communication apparatus according to supplementary note 9, comprising means for acquiring location information of the terminal from a management node and a gateway of a packet core network on the home network side to which the IMS on the home network side connects.
(Supplementary Note 11)
The communication apparatus according to supplementary note 10, wherein the gateway is a PGW (PDN (Packet Data Network) Gateway) that is connected to the IMS on the home network side and assigns an IP address to the terminal, and the management node includes a PCRF (Packet Data Network) Policy and Charging Rule Function).
(Supplementary Note 12)
The communication apparatus according to any one of supplementary notes 6 to 11, wherein the requested service includes an emergency call.
(Supplementary Note 13)
A terminal that is roaming-connected to a call control apparatus that upon reception of a call request transmitted by the terminal, identifies a service of the request based on location of the terminal and a destination telephone number of the request, determines whether or not to accept the request to provide the service of the request, comprising means that when a response notifying the rejection from the call control apparatus is received and the response is a redirect response designating the service of the request identified by the communication apparatus as redirect destination information of the request, switches from a current domain connected to the call control apparatus to another domain selected on the terminal side and transmits a call request for receiving the service of the request.
(Supplementary Note 14)
The terminal according to claim 13, comprising means that that when a response notifying the rejection from the call control apparatus is received, and the response is a redirect response designating the service of the request identified by the communication apparatus as redirect destination information of the request and a connectable or un connectable domain to receive the service of the response identified by the communication apparatus, switches from a current domain connected to the call control apparatus to a connectable domain based on the response and transmits a call request for receiving the service of the request.
(Supplementary Note 15)
The terminal according to claim 13 or 14, comprising means that transmits the request from a roaming destination to the call control apparatus of the IMS (IP (Internet Protocol) Multimedia Subsystem) on the home network side in a call mode of VoLTE (Voce over LTE (Long Term Evolution)), and on reception of a response notifying the rejection from the call control apparatus, switches from the current domain for connecting to the call control apparatus to a CS (circuit switched) domain or PS (packet switched) domain of the roaming destination and transmits a call request for receiving the service of the request.
(Supplementary Note 16)
The terminal according to any one of supplementary notes 13 to 15, when the requested service includes an emergency call.
(Supplementary Note 17)
A communication system comprising: a terminal; a call control apparatus; wherein the call control apparatus comprises means that on reception of a call request transmitted by the terminal, identifies a service of the request based on location of the terminal and a destination telephone number of the request, and determines whether to accept or to reject the request to provide the service of the request, and notifies the terminal of a response including the determination result.

(Supplementary Note 18)
The communication system according to supplementary note 17, wherein the call control apparatus comprises means for returning a redirect response designating the service of the request identified by the communication apparatus as the redirect destination information of the request to the terminal when making a response notifying a rejection.
(Supplementary Note 19)
The communication system according to supplementary note 18, wherein the call control apparatus comprises means that that in making a response notifying the rejection, returns to the terminal a redirect response indicating a connectable or unconnectable domain to receive provision of a service of the request identified by the communication apparatus.
(Supplementary Note 20)
The communication system according to any one of supplementary notes 17 to 19, wherein the call control apparatus is a call control apparatus controlling a call of IMS (IP (Internet Protocol) Multimedia Subsystem) belonging to a PS (packet exchange) domain on a home network side, which receives the request transmitted by the terminal at a roaming destination in a call mode of VoLTE (Voice over LTE (Long Term Evolution) Protocol).
(Supplementary Note 21)
The communication system according to supplementary note 20, wherein the call control apparatus Further comprises means for acquiring location information of the terminal from a management node and a gateway of a packet core network on the home network side to which the IMS on the home network side is connected.
(Supplementary Note 22)
The communication system according to supplementary note 21, wherein the gateway is a PGW (PDN (Packet Data Network) Gateway) that is connected to the IMS on the home network side and assigns an IP address to the terminal, and wherein the management node includes a PCRF (Packet Data Network) Policy and Charging Rule Function).
(Supplementary Note 23)
The communication system according to any one of supplementary notes 17 to 22, wherein the terminal comprises means that when a response notifying the rejection from the call control apparatus is received and the response is a redirect response designating the service of the request identified by the communication apparatus as redirect destination information of the request, switches from a current domain connected to the call control apparatus to another domain selected on the terminal side and transmits a call request for receiving the service of the request.
(Supplementary Note 24)
The communication system according to any one of supplementary notes 17 to 23, wherein the terminal comprises means that when a response notifying the rejection from the call control apparatus is received, and the response is a redirect response designating the service of the request identified by the communication apparatus as redirect destination information of the request and a connectable or un connectable domain to receive the service of the response identified by the communication apparatus, switches from a current domain connected to the call control apparatus to a connectable domain based on the response and transmits a call request for receiving the service of the request.
(Supplementary Note 25)
The communication system according to any one of supplementary notes 17 to 24, wherein the terminal comprises means that transmits the request from a roaming destination to the call control apparatus of the IMS (IP (Internet Protocol) Multimedia Subsystem) on the home network side in a call mode of VoLTE (Voce over LTE (Long Term Evolution)), and on reception of a response notifying the rejection from the call control apparatus, switches from the current domain for connecting to the call control apparatus to a CS (circuit switched) domain or PS (packet switched) domain of the roaming destination and transmits a call request for receiving the service of the request.

(Supplementary Note 26)

The communication system according to any one of Supplementary notes 17 to 25, wherein the service of the request includes an emergency call.

(Supplementary Note 27)

A communication method comprising:

by a call control apparatus, receiving a call request transmitted by a terminal identifying a service of the request based on location of the terminal and a destination telephone number of the request;

determining whether to accept the request to provide the service of the request or reject the response; and notifying a response including the determination result.

(Supplementary Note 28)

The communication method according to supplementary note 27, comprising the call control apparatus, when making a response notifying the rejection, returning to the terminal a redirect response designating the service of the request identified by the communication apparatus as the redirect destination information of the request.

(Supplementary Note 29)

The communication method according to supplementary note 27, comprising the call control apparatus, when making a response notifying the rejection, returns to the terminal a redirect response indicating a connectable or unconnectable domain to receive provision of a service of the request identified by the communication apparatus.

(Supplementary Note 30)

The communication method according to any one of supplementary notes 27 to 29, wherein the call control apparatus is a call control apparatus controlling a call of IMS (IP (Internet Protocol) Multimedia Subsystem) belonging to a PS (packet exchange) domain on a home network side, which receives the request transmitted by the terminal at a roaming destination in a call mode of VoLTE (Voice over LTE (Long Term Evolution) Protocol).

(Supplementary Note 31)

The communication method according to supplementary note 30, comprising the call control apparatus acquiring location information of the terminal from a management node and a gateway of a packet core network on the home network side to which the IMS on the home network side connects.

(Supplementary Note 32)

The communication method according to supplementary note 31, wherein the gateway is a PGW (PDN (Packet Data Network) Gateway) connected to the IMS on the home network side and assigning an IP address to the terminal, and wherein the management node includes a PCRF (Packet Data Network) Policy and Charging Rule Function).

(Supplementary Note 33)

The communication method according to any one of supplementary notes 27 to 32, comprising the terminal, when a response notifying the rejection from the call control apparatus is received and the response is a redirect response designating the service of the request identified by the communication apparatus as redirect destination information of the request, switching from a current domain connected to the call control apparatus to another domain selected on the terminal side and transmits a call request for receiving the service of the request.

(Supplementary Note 34)

The communication method according to any one of supplementary notes 27 to 33, comprising the terminal, when a response notifying the rejection from the call control apparatus is received, and the response is a redirect response designating the service of the request identified by the communication apparatus as redirect destination information of the request and a connectable or un connectable domain to receive the service of the response identified by the communication apparatus, switching from a current domain connected to the call control apparatus to a connectable domain based on the response and transmits a call request for receiving the service of the request.

(Supplementary Note 35)

The communication method according to supplementary notes 27 to 34, comprising the terminal transmitting the request from a roaming destination to the call control apparatus of the IMS (IP (Internet Protocol) Multimedia Subsystem) on the home network side in a call mode of VoLTE (Voce over LTE (Long Term Evolution)); and on reception of a response notifying the rejection from the call control apparatus, switching from the current domain for connecting to the call control apparatus to a CS (circuit switched) domain or PS (packet switched) domain of the roaming destination to transmit a call request for receiving the service of the request.

(Supplementary Note 36)

The communication method according to any one of supplementary notes 27 to 35, wherein the requested service includes an emergency call.

(Supplementary Note 37)

A program causing a computer constituting a call control apparatus to execute processing comprising:

upon reception of a call request transmitted by a terminal, identifying a service of the request based on a location of the terminal and a destination telephone number of the request;

determining whether to accept the request to provide the service of the request or rejects the request; and notifying the terminal of a response including a result of the determination.

(Supplementary Note 38)

A program causing a computer constituting a terminal, adapted to be roaming-connected to a call control apparatus that upon reception of a call request transmitted by the terminal, identifies a service of the request based on location of the terminal and a destination telephone number of the request, determines whether or not to accept the request to provide the service of the request, to execute processing comprising:

when a response notifying the rejection from the call control apparatus is received and the response is a redirect response designating the service of the request identified by the communication apparatus as redirect destination information of the request, switching from a current domain connected to the call control apparatus to another domain selected on the terminal side; and transmitting a call request for receiving the service of the request.

Each disclosure of the above-listed Non Patent Literatures 1,2, and 3 is incorporated herein by reference. Modification and adjustment of each exemplary embodiment and each example are possible within the scope of the overall disclosure (including the claims) of the present invention and based on the basic technical concept of the present invention. Various combinations and selections of various disclosed elements (including each element in each Supplementary Note, each element in each example, each element in each drawing, and the like) are possible within the scope of the claims of the present invention. That is, the present invention naturally includes various variations and modifications that could be made by those skilled in the art according to the overall disclosure including the claims and the technical concept.

The invention claimed is:

1. A communication apparatus in a home network, the communication apparatus comprising:
    a receiver configured to receive a session establishment request from a User Equipment (UE) being registered in an IMS (IP (Internet Protocol) Multimedia Subsystem) in the home network;
    a controller configured to identify a visited network where the UE is located;
    a transceiver configured to access a database to obtain information related to emergency numbers for the visited network, the information being used for detection of non-UE detectable emergency calls; and
    a transmitter configured to send a session rejection to the UE, the session rejection indicating the session establishment request is rejected by the communication apparatus based on detecting non-UE detectable emergency calls in the session establishment request using the information.

2. The communication apparatus of claim 1, wherein the session rejection further includes a contact header field with an emergency service uniform resource name (URN).

3. The communication apparatus of claim 1, wherein the session rejection is a response using a response code 380.

4. The communication apparatus of claim 1, wherein the communication apparatus is a proxy call session control function (P-CSCF) in the home network.

5. A User Equipment (UE) comprising:
    a transmitter configured to send a session establishment request to a communication apparatus in a home network, the UE being registered in an IMS (IP (Internet Protocol) Multimedia Subsystem) in the home network and located in a visited network;
    a receiver configured to receive a session rejection from the communication apparatus, the session rejection indicating the session establishment request is rejected by the communication apparatus; and
    a controller configured to select a domain for an emergency session based on information related to whether a domain is available to the UE.

6. The UE of claim 5, wherein the session rejection further includes a contact header field with an emergency service uniform resource name (URN).

7. The UE of claim 5, wherein the session rejection is a response using a response code 380.

8. The UE of claim 5, wherein the communication apparatus is a proxy call session control function (P-CSCF) in the home network.

9. The UE of claim 5, wherein the controller selects the domain amongst at least a packet switched (PS) domain or a circuit switched (CS) domain.

10. The UE of claim 5, wherein
    the transmitter sends a session initiation protocol (SIP) register message to the communication apparatus in order to register the UE in the IMS, and
    the transmitter sends the session establishment request to the communication apparatus after sending the SIP register message.

11. A communication method by a communication apparatus in a home network, the communication method comprising:
    receiving a session establishment request from a User Equipment (UE) being registered in an IMS (IP (Internet Protocol) Multimedia Subsystem) in the home network;
    identifying a visited network where the UE is located;
    accessing a database to obtain information related to emergency numbers for the visited network, the information being used for detection of non-UE detectable emergency calls; and
    sending a session rejection to the UE, the session rejection indicating the session establishment request is rejected by the communication apparatus based on detecting non-UE detectable emergency calls in the session establishment request using the information.

12. A communication method by a User Equipment (UE) the communication method comprising:
    sending a session establishment request to a communication apparatus in a home network, the UE being registered in an IMS (IP (Internet Protocol) Multimedia Subsystem) in the home network and located in a visited network;
    receiving a session rejection from the communication apparatus, the session rejection indicating the session establishment request is rejected by the communication apparatus; and
    selecting a domain for an emergency session based on information related to whether a domain is available to the UE.

* * * * *